United States Patent [19]
Burke et al.

[11] Patent Number: 5,485,616
[45] Date of Patent: Jan. 16, 1996

[54] USING PROGRAM CALL GRAPHS TO DETERMINE THE MAXIMUM FIXED POINT SOLUTION OF INTERPROCEDURAL BIDIRECTIONAL DATA FLOW PROBLEMS IN A COMPILER

[75] Inventors: Michael G. Burke, Yonkers, N.Y.; Paul R. Carini, Sherman, Conn.; Jong-Deok Choi, Mount Kisco, N.Y.

[73] Assignee: International Business Machines Corporation, Armonk, N.Y.

[21] Appl. No.: 135,199

[22] Filed: Oct. 12, 1993

[51] Int. Cl.$^6$ ................................................. G06F 9/44
[52] U.S. Cl. ................................. 395/700; 364/DIG. 1; 364/280.5; 364/280.4
[58] Field of Search .................... 395/700, 650; 364/280.4, 280.5, DIG. 1

[56] References Cited

U.S. PATENT DOCUMENTS

| | | |
|---|---|---|
| 4,503,492 | 3/1985 | Pilat. |
| 4,893,234 | 1/1990 | Davidson et al.. |
| 4,922,414 | 5/1990 | Holloway et al.. |
| 5,107,418 | 4/1992 | Cramer et al.. |
| 5,161,216 | 11/1992 | Reps et al. ........................... 395/375 |
| 5,170,465 | 12/1992 | McKeeman et al.. |
| 5,175,856 | 12/1992 | Van Dyke et al. .................... 395/700 |
| 5,182,806 | 1/1993 | McKeeman et al.. |
| 5,327,561 | 7/1994 | Choi et al. ............................ 395/700 |

OTHER PUBLICATIONS

Burke, Michael & Barbara G. Ryder, "A Critical Analysis of Incremented Iterative Data Flow Analysis Algorithms", IEEE Jul. 1990.
Marlowe, Thomas J. & Ryder, Barbara G., "Hybrid Incremental Alias Analysis", 1991 IEEE.
Banning, J., Sixth Annual ACM Symposium on Principles of Programming Languages, (Jan. 1979) pp. 29–41.
Cooper, et al, SIGPLAN '88 Conference on Programming Language Design and Implementation (Jun. 1988) pp. 57–66.
Callahan, D., Proceedings of the SIGPLAN '88 Conference on Programming Language Design and Implementation, (Jun. 1988) pp. 47–56.
Landi & Ryder, Eighteenth Annual ACM Symposium on Principles of Programming Languages, Jan. 1991 pp. 93–103.
Harold and Soffa, Proceedings of the IEEE Computer Society 1990 International Conference on Computer Languages, (1990) pp. 297–306.
Landi & Ryder, SIGPLAN '92 Conference on Programming Language Design and Implementation pp. 235–248. (Jun. 1992).
J. Ferrante, K. Ottenstein "The Program Dependence Graph and Its Use In Optimization" IBM Technical Report RC–10543 Jun. 1984 Computer Science pp. 1–33.

(List continued on next page.)

Primary Examiner—Kevin A. Kriess
Attorney, Agent, or Firm—Louis J. Pecello

[57] ABSTRACT

By novel use of the Program Call Graph representation of computer programs, this method and apparatus provides a general analysis method for interprocedural bidirection data flow problems in computer software programs. The invention has many uses, including the determination of interprocedural alias analysis of computer software programs which contain pointers.

The method starts by constructing a Program Call Graph representation of a computer program with each node of the graph representing a routine of the program. An internal representation of each node is then constructed and initial interprocedural values are associated with appropriate nodes. An interprocedural traversal of the Program Call Graph is performed in which each node is visited; an intraprocedural propagation is performed to develop a new set of interim solution values; and the new interim solution values are interprocedurally propagated. The new interim solution is propagated in a forward and backward direction in one pass of the traversal. The interprocedural traversal of the Program Call Graph is repeated until the interprocedural solution does not change.

9 Claims, 7 Drawing Sheets

OTHER PUBLICATIONS

L. Gurevich, Harel & Rubin, "Computing the Aliasing Relation" IBM TDB Jan. 1986 pp. 3503–3508.

K. Gilbert, "Effective Register Management During Code Generation" Jan. 1973 IBM TDB pp. 2640–2645.

ACM SIGPLAN '92 Conference on Programming Language Design and Implementation, San Francisco, Calif., vol. 27 No. 7 Jul. 1992 (ABSTRACT).

L. J. Hendren, J. Hummel, A. Nicolau "Abstractions for Recursive Pointer Data Structures: Improving the Analysis and Transformation of Imperative Programs" SIGPLAN Not.USA vol. 27, No. 7, pp. 249–260 Jul. 1992 (ABSTRACT).

J. Crowcroft, I. Wakeman, Z. Wang, D. Sirovica, "Is Layering, Harmful?" (Remote Procedure Call) IEEE Netw. (USA) vol. 6,. No. 1, Jan. 1992, pp. 20–24 (ABSTRACT).

Yi–Hsiu Wei, A. Stoyenko, G. Goldszmidt "The Design of a Stub Generator for Heterogeneous RPC Systems" J. Parallel Distrib. Comput. USA, vol. 11, No. 3, pp. 188–197 Mar. 1991 (ABSTRACT).

A. Ah–kee "Proof Obligations for Blocks and Procedures" Form. Asp. Comput. UK, vol. 2, No. 4, pp. 312—330, Oct.–Dec. 1990 (ABSTRACT).

E. G. Wagner et al., "On Declarations" Categorical Methods in Computer Science With Aspects from Topology, Springer–Verlag, Vi+350 pp. 261–267, 1989 (ABSTRACT).

D. R. Chase, M. Wegman, F. Zadeck, "Analysis of Pointers and Structures" SIGPLAN Not. (USA), vol. 25, No. 6, pp. 296–310, Jun. 1990 (ABSTRACT).

L. Beliard, "Microsoft C 6.0: The New–Generation C" Micro Syst. (France) No. 109, pp. 105–111, Jun. 1990 (Journal Paper) (ABSTRACT).

S. Richardson, M. Ganapathi "Code Optimization Across Procedures" Computer (USA), vol. 22, No. 2, pp. 42–50, Feb. 1989 (ABSTRACT).

H. Dietz, C–H Chi, "CRegs: A New Kind of Memory for Referencing Arrays and Pointers" Proceedings. Supercomputing '88 IEEE Comput. Soc. Press, xii+458 pp. 360–367 (ABSTRACT).

M. L. Scott et al., "Design Rationale for Psyche, A General Purpose Multiprocessor Operating System" Proceedings Penn State U (xii+461+462x+262xiii+311) pp. 255–262 vol. 2 1988. (ABSTRACT).

V. A. Guarna, F. Briggs, Conference Paper Proceedings, 1988 International Conference on Paralel Processing (xiii+461+X+262+xiii+311) pp. 212–220 vol. 2, 1988 (ABSTRACT).

J. R. Larus, P. Hilfinger, "Detecting Conflicts Between Structure Accesses" SIGPLAN Not. (USA) vol. 23, No. 7, pp. 21–34, Jul. 1988 (ABSTRACT).

J. P. Jacky, I. J. Kalet, "An Object–Oriented Programming Discipline for Standard Pascal" Commun. ACM(USA), vol. 30. No. 9, 772–776, Sep. 1987 (ABSTRACT ).

R. B. Essick, IV, "Cross–Architecture Procedure Call", RPT. No. UIUCDCS–R–87–1340, v+144 pp. May 1987 (ABSTRACT).

D. A. Price, P. C. Poole, "Dynamic Data Flow Analysis—A Tool for Reliability" Instn. Eng. Australia, Barton, ACT, Aust. pp. 97–100, Feb. 1986 (ABSTRACT).

M. Burke, R. Cytron "Interprocedural Dependence Analysis and Parallelization" Dept. of Comput. Sci., IBM TJW Res. Center, Yorktown vol. 21, No. 7, pp. 162–175 Jul. 1986 Conference Paper (ABSTRACT).

K. D. Cooper, K. Kennedy, "Efficient Computation of Flow Insensitive Interprocedural Summary Information" SIGPLAN 84' vol. 19, No. 6, pp. 247–258, Jun. 1984 (ABSTRACT).

S. Walters, "The Advanced Architecture of the Z8 Microcomputer" Electron. Conventions, El Segundo, Calif., USA pp. 26–3/1–12, 1981 Conf. Paper (ABSTRACT).

A. L. Chow, A. Rudmik "The Design of a Data Flow Analyzer" SIGPLAN 82' vol. 17, No. 6, pp. 106–113, Jun. 1982 Conf. Paper (ABSTRACT).

G. Barth, "Aliasing in Interprocedural Data Flow Analysis" Fachbereich Informatik, Germany, No. 43, pp. 275–286, 1981 (ABSTRACT).

R. Cartwright, D. Oppen, "The Logic of Aliasing" Journal Paper Acta Inf. (Germany), vol. 15, No. 4, pp. 365–384, Aug. 1981 (ABSTRACT).

D. H. Uyeno, W. Vaessen, "PASSIM: A Discrete–Event Simulation Package for PASCAL Simulation" Journal Paper Simulation (USA), vol. 35, No. 6, pp. 183–190, Dec. 1980 (ABSTRACT).

F. T. Bradshaw et al., "Procedure Semantics and Language Definition" SIGPLAN Not. (USA), vol. 15, No. 6, pp. 28–33, Jun. 1980 (ABSTRACT).

R. L. Schwartz, "Aliasing Among Pointers in EUCLID" Inf. Process. Lett. (Netherlands), vol. 9, No. 2, pp. 76–79, Aug. 1979 Jour. Paper (ABSTRACT).

D. B. Lomet, "Data Flow Analysis in the Presence of Procedure Calls" IBM Research & Dev. USA, vol. 21, No. 6, pp. 559–571, Nov. 1977 (ABSTRACT).

T. Yamamoto "A Scan Conversion Algorithm Using Quad–Tree Rerpsentation of dZ Buffer" Syst. Comput. Jpn. USA, vol. 23, No. 8, pp. 65–74 1992 (ABSTRACT).

A. W. Appel, Zhong Shao, "Callee–save Registers in Continuation–Passing Style" LISP Symb. Comput. (Netherlands) vol. 5, No. 3, pp. 191–221 Sep. 1992 (ABSTRACT).

P. Emma, J. Pomerene "Conditional Execution in a Register Management Scheme for Out of Sequence Execution" IBM TDB n10A Mar. 1992 pp. 449–454.

```
S0:  char *u,a,b,c,...,z;
S1:  P()
S2:  {
S3:    u = &a;
S4:    *u = 'A';
S5:    Q();
S6:    *u = 'B';
S7:  };
S8:  Q()
S9:  {
S10:   u = &b
S11: };
```

```
int **p,**q,*r,*s, X,Y;

SUB1(){           SUB2()
  p=&s;             p=q;
  r=&X;             SUB3();
  SUB3();           ...
  *r=10;          };/*SUB2*/
  Y=X;
};/*SUB1*/        SUB3(){
                    *p=r;
                  };/*SUB3*/
```

USING PROGRAM CALL GRAPHS TO DETERMINE THE MAXIMUM FIXED POINT SOLUTION OF INTERPROCEDURAL BIDIRECTIONAL DATA FLOW PROBLEMS IN A COMPILER

FIELD OF THE INVENTION

The present invention relates generally to a system and method of efficiently handling compiler optimization problems, and more particularly to a system and method for solving interprocedural bidirectional data flow problems.

BACKGROUND OF THE INVENTION

Optimizing and parallelizing compilers perform data flow analysis to insure the correctness of their program transformations. Software development environments also utilize data flow analysis. The input to data flow analysis is a data flow framework as described in Marlowe, T. J., *Data Flow Analysis and Incremental Iteration*, Rutgers University (October 1989). The data flow framework includes a flow graph and a formal basis for describing the behavior and interaction of flow graph nodes (FIG. 1). The behavior of each node is formalized by its transfer function (FIG. 2), which describes how a node affects the solution as a function of the behavior of other nodes. When considered as a whole, the node transfer functions present a set of simultaneous equations, whose maximum fixed point (MFP) global evaluation provides the best computable solution at all edges or nodes of the flow graph. In other words, all other correct solutions are either uncomputable or not as precise.

A data flow framework D is defined in terms of three components. That is, D=<FG,L,F>, where a flow graph FG=(V,E,r) is a finite set 17 of nodes that includes a distinguished start node r (shown as node V1 in FIG. 1), and a finite set E of edges (shown as e1, e2, e3, and e4 in FIG. 1). An edge is an ordered pair (v,w) of nodes; v is the source of the edge and w its target. For example, in FIG. 1, V1, V2, V3, and V4 are nodes with V1 being the start node r. The set of edges, E, comprise e1, e2, e3, and e4. The source of e2 is 172 and its target is V3. The edges are designated by their respective ordered pair of source and target nodes, i.e., (v,w), therefore, e1=(V1, V2); e2=(V2, V3); e3=(V2, V4); and e4=(V4, V2). Where the edge (v,w) is in E, we say that v is a predecessor of w and w a successor of v. For example, in FIG. 1, V2 is a predecessor of V3 and of V4, and also a successor of 174. A sequence of edges $(v_1,v_2),(v_2,v_3), \ldots, (v_{n-1},v_n)$ in FG is a path from $v_1$ to $v_n$. For example, in FIG. 1, e1, e2 is a path from V1 to V3 and e3, e4, e2 is a path from V2 to V3. If there is a path from $v_i$ to $v_j$, we say that $v_i$ reaches $v_j$ or that $v_j$ is reachable from $v_i$. Every node in FG is reachable from r, and r is not the target node of any edge in E. A cycle is a path for which $v_1=v_n$. For example, in FIG. 1, the path e3,e4 forms a cycle. A "meet semilattice" is a set of elements and a partial ordering of those elements which is defined by a "meet" ($\cap$) operator. More specifically, the meet semilattice L=<A,TOP,BOTTOM,<, $\cap$>, where A is a set whose elements form the domain of the data flow problem (i.e., the inputs and outputs associated with the flow graph nodes), TOP and BOTTOM are distinguished elements of A (symbolizing the best and the worst possible solution to the optimization problem, respectively,) < is a reflexive partial order, and $\cap$ is the associative and commutative "meet" operator, such that for any a,b in A, $a<b \iff a \cap b=a$ $a \cap a=a$ $a \cap b<a$ $a \cap TOP=a$ $a \cap BOTTOM=BOTTOM$ Where the elements of the domain are sets, examples of meet operators are intersection and union. Where the operator is union, TOP would typically be the empty set and BOTTOM the universal set. Where the operator is intersection, TOP would typically be the universal set and BOTTOM the empty set. Intuitively, higher points in the lattice correspond to higher degrees of information.

The input and output to a node Y are elements of A. A transfer function (FIG. 2) operates on the input to a node Y to determine the output of the node Y. More specifically, F is a set of transfer functions such that F is a subset of $\{f:A \to A\}$. That is, any function in F has A as its domain and its range. This set includes the identity function i (which, applied to the input of a node, produces output identical to the input), and the set is closed under composition and meet. The data flow effect of node Y is described by its transfer function $f_y$ in F. The local properties of Y are captured by its transfer function: $OUT_Y=f_Y(IN_Y)$, where $IN_Y$ and $OUT_Y$ are in A. After a framework has been globally evaluated, each node Y has a solution $OUT_Y$ that is consistent with transfer functions at every node. In general, the best computable solution for a data flow framework is the maximum fixed convergence of the equations:

$OUT_{root}=TOP$ $IN_Y=\cap(\forall X \text{ in } Preds(Y))OUT_X$ $OUT_Y=f_Y(IN_Y)$ where Preds(Y) is the set of predecessors of node Y. The solution to the above equations is called the Maximum Fixed Point (MFP) solution. During an evaluation, iterations over the flow graph nodes take place until all node outputs remain unchanged. During such evaluation, $IN_Y$ travels down the lattice from TOP to the clement that represents the best computable solution prior to Y, regardless of the flow path taken.

In a forward data flow problem, for each node Y, $IN_Y$ is defined in terms of the predecessors of Y (as in the equations above). In a backward data flow problem, for each node Y, $IN_Y$ is defined in terms of the successors of Y. A data flow problem which is either forward or backward is unidirectional. A data flow problem for which $IN_Y$ for each node Y depends on both the predecessors and successors of Y is bidirectional.

The prior art describes a program in terms of a general program model that is also used by this disclosure. This program model consists of a set of one or more external procedures, where an external procedure is one that is not contained (declared) within another procedure but may contain internal procedures nested within it. One of the external procedures is the main procedure. Recursion is allowed: A procedure may directly or indirectly invoke itself.

The containment relationships among the procedures in a program P may be represented as a forest of trees $F_P$, where the nodes of the trees represent procedures/routines. For each external procedure/routine, there is a tree in $F_P$ whose root node represents the external procedure/routine. The variables declared directly within a procedure/routine are local to the procedure/routine, while the variables declared in the ancestors of a procedure/routine in $F_P$ are global to it. The set of variables global to procedure P is denoted GLOBAL(P). Among the local variables of a procedure P are zero or more formal parameters. The set of such variables in P is denoted FORMAL(P). A variable that is either local or global with respect to a procedure P is known to P. An external variable is one that is global to all the procedures of a program. The local variables of a procedure are visible to it; its global variables that are not hidden from it are also visible. The specific mechanism for hiding is irrelevant to our method. One mechanism provided for hiding a global variable is the declaration of a local variable of the same name in an internal procedure.

The prior art includes a model for procedural interaction which is also used in this disclosure. In the model, a statement in a program that invokes a procedure is referred to as a call site. It designates a called procedure, which must be visible to the procedure containing the call site (the calling procedure). For each formal parameter of the called procedure, the call site must designate an argument that is associated with it. An argument may be a reference argument, which is a variable that is visible to the calling procedure and is passed-by-reference to its corresponding formal parameter. When the call site is invoked, a formal parameter that is associated with a reference argument assumes the same address in memory as the argument. Procedures interact at call sites through reference arguments and also through variables that are global to the called procedure. Thus a call site s is said to pass a variable X to a variable Y if and only if variable Y is the same variable as X and is global to the called procedure, or X is passed-by-reference to Y.

See FIG. 3. The interprocedural structure of a program 350 is represented by a Program Call Graph (PCG) 300, a flow graph for which each procedure is uniquely represented by a single node (301–304) and each call site by a unique edge (311–314). The start node 304 represents the main procedure. The node representing a given procedure/routine P shall be referred to as node P. The edge (P,Q) represents a call site in P that invokes Q. By the definition of a flow graph, it is assumed that every node in the call graph is reachable from the main procedure 304.

In the presence of procedure calls, data flow analysis must make worst case assumptions about the data flow effect of the call unless the analysis is interprocedural —i.e., is performed across procedure boundaries. Worst-case assumptions about interprocedural information inhibit program transformations for optimization or parallelization. Interprocedural data flow analysis algorithms have been developed for various interprocedural problems (Banning, J., *Sixth Annual ACM Symposium on Principles of Programming Languages*, 29–41 (January 1979); Cooper et al., *SIGPLAN '88 Conference on Programming Language Design and Implementation*, 57–66 (June 1988).

Interprocedural data flow analysis may be either flow-sensitive or flow-insensitive. A flow-sensitive analysis makes use of the intraprocedural control flow information associated with individual procedures. A flow-insensitive analysis makes no use of intraprocedural control flow information. In ignoring control flow information, such an analysis does not have to consider the possible paths through a procedure, reducing the cost of the analysis in both space and time. In general, a flow-sensitive algorithm is more precise (i.e., higher in the semilattice) but less efficient in time and space than a flow-insensitive algorithm for the same problem.

STATEMENT OF PROBLEMS WITH THE PRIOR ART

Particular algorithms have been developed for particular interprocedural bidirectional data flow problems, but no general method for solving problems in this class has been developed. Some interprocedural bidirectional algorithms have been based on the program summary graph, a representation developed by Callahan for flow-sensitive interprocedural data flow problems. Callahan defines the program summary graph in Callahan, D., *Proceedings of the SIGPLAN '88 Conference on Programming Language Design and Implementation*, 47–56 (June 1988), where it is used as a basis for solving unidirectional flow-sensitive interprocedural data flow problems, KILL and LIVE. The exact form of the program summary graph depends upon the problem which it is used to solve, but the representation of interprocedural control flow information is always the same. The interprocedural control flow graph (Landi and Ryder, *Eighteenth Annual ACM Symposium on Principles of Programming Languages*, 93–103 (January 1991)) captures this common interprocedural control flow representation. Within a procedure control flow graph, call site nodes are split into call and return nodes. Each procedure control flow graph contains an entry node and an exit node. Two interprocedural control edges are added for each call site: one from the call node to the entry node of the invoked procedure, and one from the exit node of the invoked procedure to the return node of the call site. Procedure flow graphs (usually in a condensed form) are always used to represent control flow within individual procedures. The procedure control flow graphs are linked together by interprocedural control edges to form the interprocedural control flow graph. In the program summary graph, additional edges are inserted to represent summary intraprocedural information about the sets of paths between nodes within a procedure, and an interprocedural edge is created for each individual variable which is passed from a call node to an entry node and from an exit node to a return node. These additional edges vary with the application. Callahan's program summary graph (with additional summary edges) is applied by Harrold-Soffa to determine interprocedural def-use chains, which is a bidirectional data flow problem (Harrold and Soffa, *Proceedings of the IEEE Computer Society* 1990 *International Conference on Computer Languages*, 297–306 (1990)). Their algorithm has two interprocedural passes, one forward and one backward, through the program summary graph.

There are several problems with the program summary graph representation. For the program summary graphs of Callahan and Harrold-Soffa, an example can be easily constructed which contains an edge from the entry node to the exit node and every call node; and an edge from each return node, to the exit node and to every call node, for each variable in a procedure. The size of the program summary graph representation is large for this example. The size of the program summary graph impacts both space and time efficiency, as an algorithm based on the program summary graph must traverse it. In the uses of the program summary graph, the mechanisms for representing the call stack (properly matching calls and returns) and handling recursion vary. In Callahan, return edges are ignored, making it impossible to incorrectly match calls and returns; but only unidirectional problems permit ignoring return (or call) edges. In Harrold-Soffa, a bidirectional problem is solved by handling call and return edges in separate passes. Other types of flow-sensitive problems call for still other techniques. However, the prior art discloses no general approach. This suggests that the prior art program summary graph techniques have limited applicability, and therefore do not provide a basis for a general solution to interprocedural bidirectional problems.

The prior art known to the inventors discloses no general method for solving interprocedural bidirectional data flow problems. Therefore, the prior art requires development of a particular method for each different interprocedural bidirectional data flow problem.

Landi-Ryder (*SIGPLAN '92 Conference on Programming Language Design and Implementation*, 235–248 (June 1992)) employ the interprocedural control flow graph (ICFG) in an algorithm which determines interprocedural aliases in programming languages that include general pointers (an interprocedural bidirectional data flow problem).

The ICFG contains both inter- and intraprocedural edges, which is a disadvantage with respect to its potential use as the basis for a general method for solving interprocedural bidirectional problems. An interprocedural edge, representing a transfer of control between one procedure and another, generates bindings between variables (see the description of procedural interaction in the preceding background section). This information must be incorporated into the data flow framework for a particular problem. The intraprocedural edges (or nodes) do not create new bindings, but perform actions which must be captured in the transfer functions for the data flow framework. There is a distinction, then, between the kinds of functions generated for the two kinds of edges, making it difficult to map an ICFG-based description into the general definition of data flow frameworks given in the preceding background section.

Another disadvantage to the ICFG representation is that it is not compatible with a summary form representation of intraprocedural information. A summary representation of a procedure does not contain its whole control flow graph, but only those nodes which are needed for the interprocedural computation (such as entry, call site, and exit nodes). When visiting a routine during the traversal of the ICFG, it is necessary to visit the individual nodes of its control flow graph and to propagate their individual transfer functions. This generates a less efficient solution than with summary information and disallows a flow-insensitive representation.

Another disadvantage to the ICFG representation is that the size of the ICFG increases with the size of the program. For a large program, it may be inefficient or impossible to store the entire ICFG in memory. Although memory requirements could be lessened by decomposing the ICFG into partial representations, algorithms based on the ICFG would then have to be revised at some increased cost.

OBJECTS OF THE INVENTION

An objective of this invention is a general system and method for solving interprocedural bidirectional data flow problems in computer software program analysis.

Another objective of this invention is an improved system and method for interprocedural alias analysis of computer software programs that have pointers.

SUMMARY OF THE INVENTION

The present invention is a method and apparatus that enables a general framework for solving interprocedural bidirectional data flow problems.

The method is based on the Program Call Graph (PCG) representation of a program. The use of the PCG for solving interprocedural bidirectional data flow problems is novel. The PCG has only interprocedural edges, allowing a distinctly separate representation of intraprocedural transfer functions from interprocedural transfer functions. This separation of the inter- and intraprocedural frameworks has the advantage that the mapping of a particular interprocedural bidirectional data flow problem to the general framework for monotone data flow problems is straightforward, in contrast to the prior art.

The separation of inter- and intraprocedural representations has the additional advantage that it allows intraprocedural information to be represented in summary form. For example, transfer functions describing the effect of paths between pairs of nodes which are relevant to the interprocedural computation (such as <entry, call site>pairs and<call site, exit>pairs) can represent the intraprocedural information. When visiting a routine during the traversal of the PCG, it is then unnecessary to visit the individual nodes of the control flow graph and propagate their individual transfer functions. This allows for a more efficient solution. The method does not depend upon the particular form of the internal representation, which may be either flow-sensitive or flow-insensitive. Examples of internal representations which could be employed with our method are the control flow graph; some sparse version of it, such as the Sparse Evaluation Graph (one preferred embodiment disclosed in U.S. Pat. No. 5,327,561 filed on Sep. 20, 1991 entitled "System and Method for Solving Monotone Information Propagation Problems" which is herein incorporated by reference in its entirety); or a flow-insensitive summary representation.

With our PCG-based representation of the program, each routine has a separate internal representation. An advantage to the separate representation of individual routines is the efficient use of memory. Since it is unnecessary for the internal representation of more than one routine to be in memory at once, the memory requirement of the intraprocedural computation depends on the size of the largest routine, compared to the size of the whole program for any ICFG-based method. The memory required by the interprocedural component of our method grows with the size of the PCG, which is small compared to the ICFG methods.

To perform the method, a Program Call Graph (PCG) is first constructed. The PCG is a general representation of the computer program to be analyzed and contains PCG nodes each of which represents a routine in the program. Next an internal(intraprocedural) representation is constructed for each node of the PCG. The internal representation may (or may not) represent the procedure's control flow information.

Once the PCG and intraprocedural representation are constructed, initial interprocedural values are associated with appropriate nodes in the PCG. An intraprocedural propagation step is performed that develops a new set of interim solution values within the intraprocedural representations. In one preferred embodiment of this step, procedures are processed one at a time, allowing an efficient use of memory. Some of these new interim solution values are then interprocedurally propagated by an interprocedural traversal.

The traversal comprises a visit to each node of the PCG, and proceeds in topological order. When a PCG node is visited, the new interim information is propagated in a forward and backward direction to other PCG nodes as determined by the structure (edges) of the PCG. Each node is visited until the traversal is complete, i.e., when all PCG nodes have been visited. Note that the new interim information is propagated in a forward and backward direction in one pass of the traversal.

A completed traversal generates a new set of interim interprocedural values. If the new set of values differs anywhere from the set of interim interprocedural values of the prior traversal, another iteration begins at the step of intraprocedural propagation. This iteration includes another interprocedural traversal of the PCG. Alternatively, if the two interprocedural value sets are the same, the interprocedural solution has converged and the process ends. This use of the PCG for solving interprocedural bidirectional data flow problems is novel.

This general method can be used to determine alias relationships in computer programs that have pointers. It can also be used to perform constant propagation across procedure calls.

DETAILED DESCRIPTION OF THE INVENTION

Figure 4:
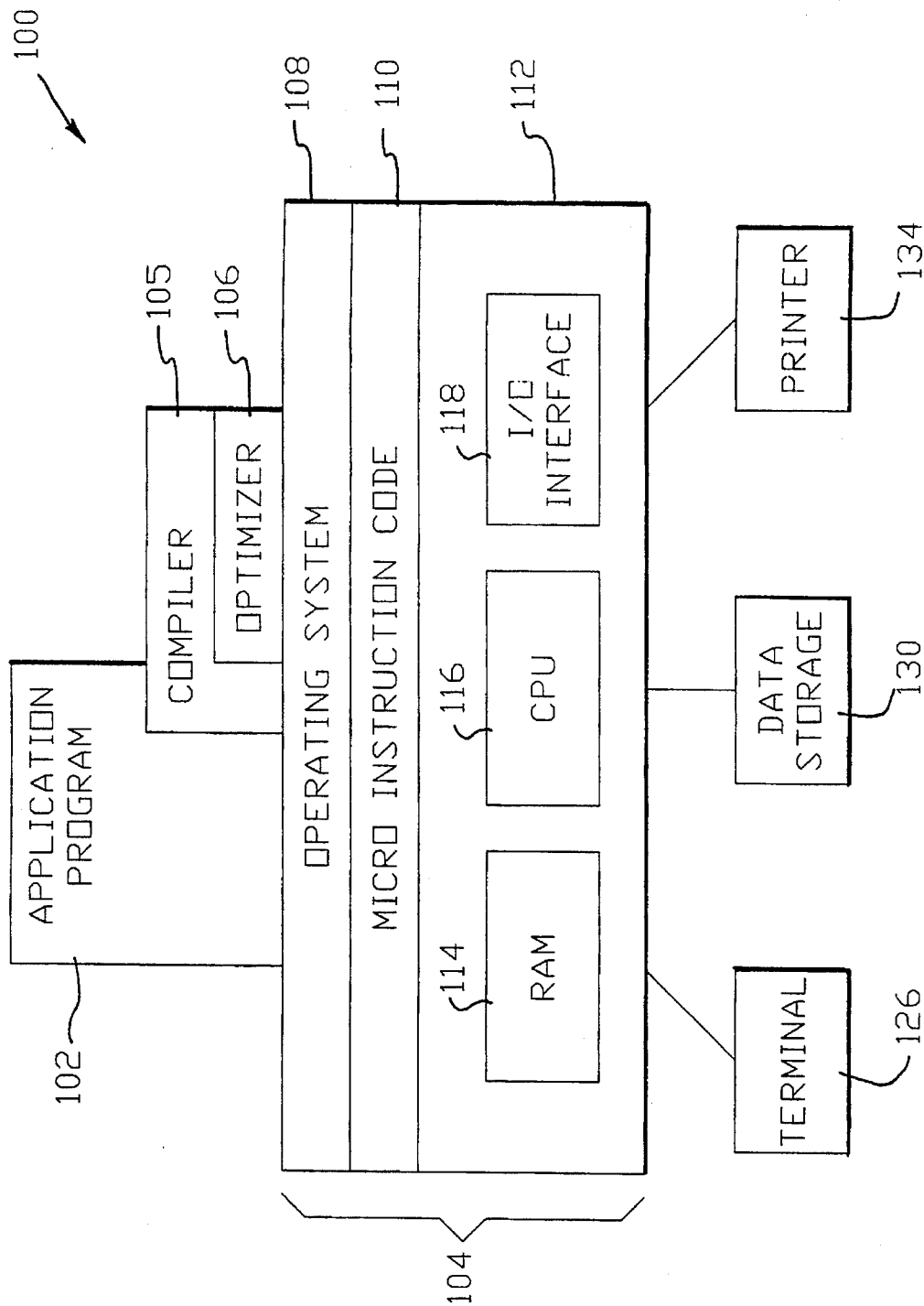
FIG. 4 is a block diagram of a preferred hardware embodiment with a compiler practicing the present invention.

FIG. 4 is a block diagram showing a computer system 100 on which a preferred embodiment of the present invention operates. The preferred embodiment includes one or more application programs 102. One type of application program 102 is a compiler 105 which includes an optimizer 106. The compiler 105 and optimizer 106 are configured to transform a source (like an application program 102) program into optimized executable code. More generally, the source program is transformed to an optimized form and then into executable code. (A more detailed description of basic concepts or compilers is "found in Aho et al., *Compilers: Principles, Techniques, and Tools* by Addison-Wesley (1986) which is hereby incorporated by reference in its entirety.)

The compiler 105 and optimizer 106 operate on a computer platform 104 that includes a hardware unit 112. The hardware unit 112 includes one or more central processing units (CPU) 116, a random access memory (RAM) 114, and an input/output interface i 18. Micro-instruction code 110, for instance a reduced instruction set, may also be included on the platform 104. Various peripheral components may be connected to the computer platform 104 including a terminal 126, a data storage device 130, and a printing device 134. An operating system 108 coordinates the operation of the various components of the computer system 100. An example of computer system 100 like this is the IBM RISC System/6000 (RISC System/6000 is a trademark of the IBM Corporation.) It is readily understood that those skilled in the computer arts will be familiar with many equivalent computer systems 100.

Figure 5:
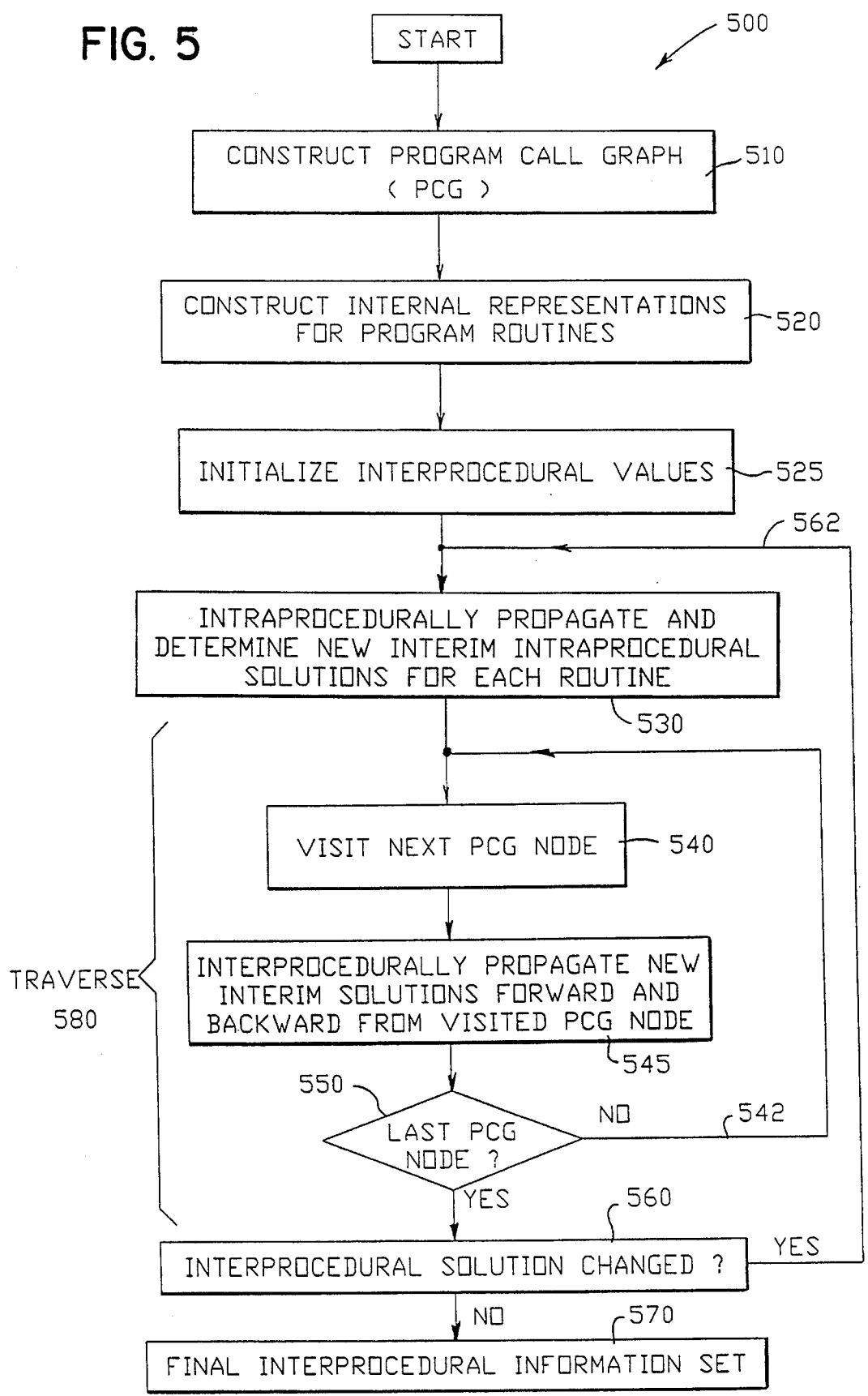
FIG. 5 is a flow chart showing the steps of the present invention.
Figure 6:
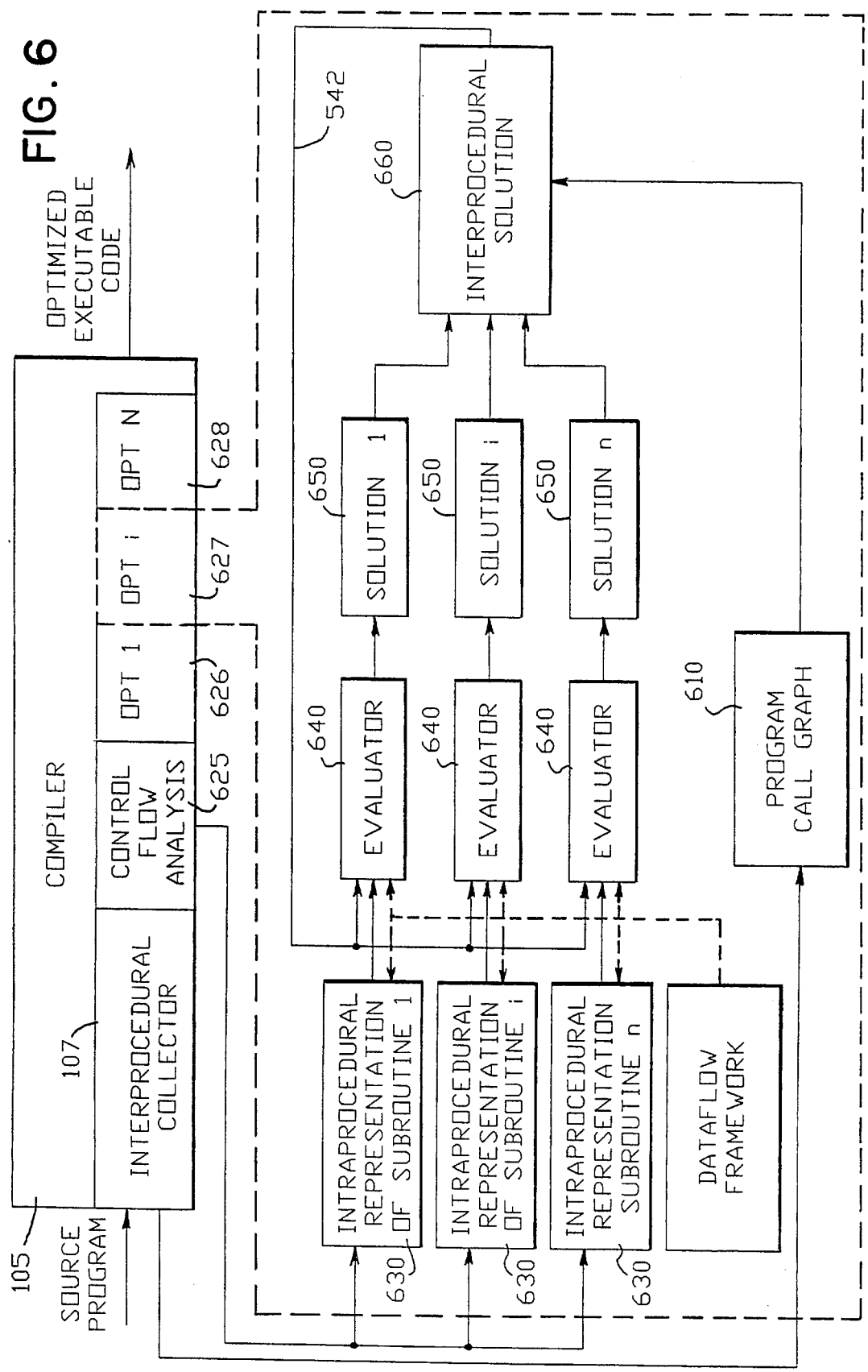
FIG. 6 is a block diagram showing the flow of information for the present invention and relating the information to the phases of a compiler.

FIG. 5 is a flow chart showing the steps of the present invention method. FIG. 6 shows the flow of information between the modules which embody the method for bidirectional data flow analysis, and the modules which embody the context for the method. In the preferred embodiments, the method is executed as part, or a phase 627, of more than one phase (107, 625–628) of the compiler optimizer program 106 (FIG. 4). Other optimizer 106 phases (626 and 628), used to optimize a given application program 102, may precede and follow the execution (running) of the present method.

Figure 1:
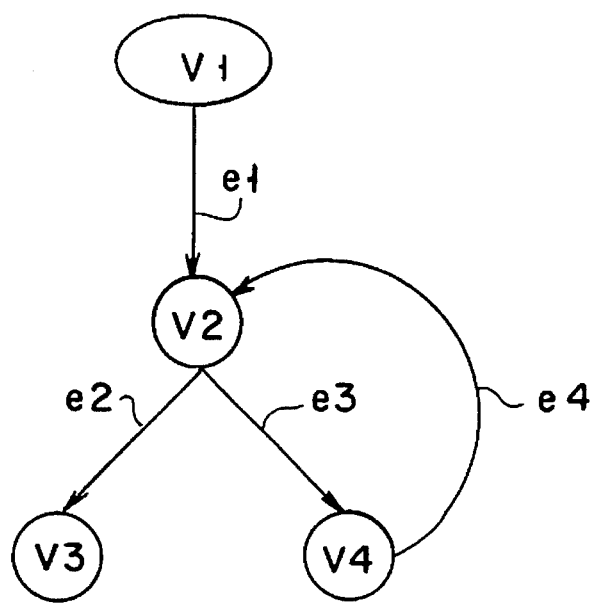
FIG. 1 shows a prior art example of a flow graph.
Figure 2:
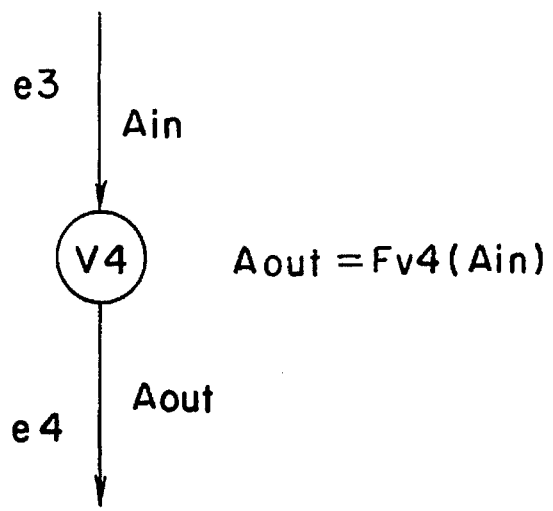
FIG. 2 shows a prior art example of a transfer function.
Figure 3:
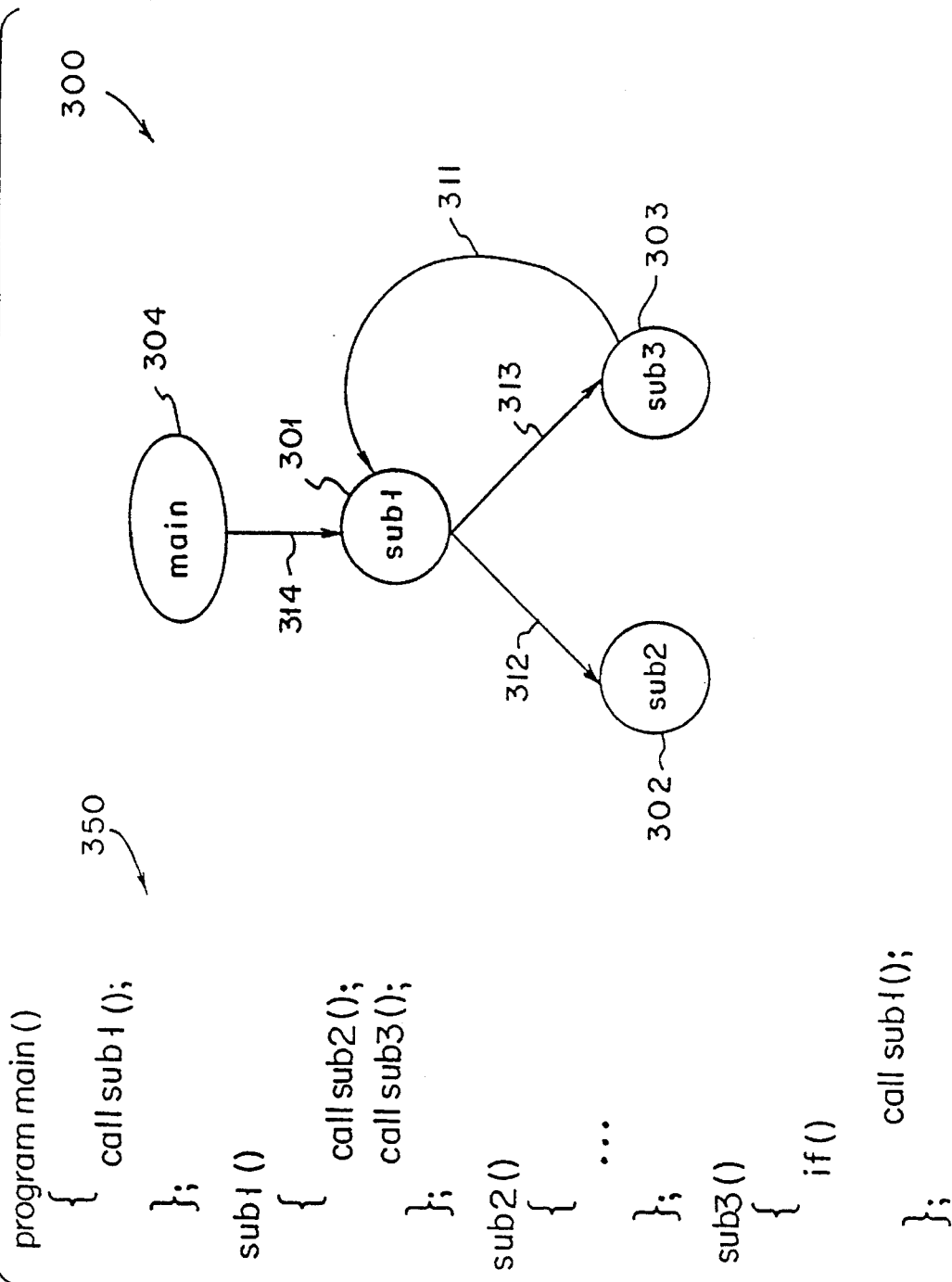
FIG. 3 shows a prior art example of a program call graph.

Interprocedural data flow information is determined and analyzed in the method by a novel use of the Program Call Graph (PCG). Using this method, the general class of interprocedural bidirectional data flow problems can be solved in an efficient manner. The method 500 in FIG. 5 starts by building or constructing 510 a PCG 610 using techniques disclosed in the prior art. Also refer to FIGS. 3 and 6. (However, note that the prior art known to the inventors has never disclosed or recognized the advantages of using a PCG to solve interprocedural bidirectional data flow problems.)

Typically, the construction of the Program Call Graph (PCG) 510 is performed by an "interprocedural collector" (107 in FIG. 6)that is located in the computer system 100 compiler 105 (preferably in the optimizer 106.) The interprocedural collector 107 is a program that traverses the program text of each subroutine in an application program 102 and identifies all the subroutines called in the application program. As a subroutine is first identified, either as a routine to be traversed or as a routine that is invoked during a traversal, a node in the PCG (call graph) is generated. As a subroutine called by a calling routine is identified, an edge is added to the PCG from the calling routine (node) to the called routine (node).

The PCG construction 510 identifies the application program 102 routines (nodes) that call and are called in the program and their respective call sites (edges).

Once this set of application program 102 routines has been identified, an intraprocedural representation (i.e. internal representation) of each routine is constructed 520. This is performed by a phase 625 of the compiler 105 or optimizer 106. This compiler phase analyzes each PCG node (routine) separately and constructs 520 an internal representation 630. The method does not depend upon the particular form of the internal representation, and one preferred embodiment uses a summary representation in all cases for efficiency.

After initialization 525 of the interprocedural solution 660 (in general, it would be initialized to TOP), the sequence of steps of the method is repeated until the interprocedural solution converges, as described below. A data flow evaluation of the each subroutine is performed, using the interprocedural solution as input for each subroutine 640. This evaluation comprises determining and propagating new interim interprocedural solutions 530. In this step, procedures are processed one at a time, allowing an efficient use or memory. These solutions 650 are used as input to the determination of the interprocedural solution 660. The interprocedural solution is determined by traversing the PCG 580. The traversal comprises a visit to each node of the PCG 540, and the traversal proceeds in topological order. When a PCG node is visited, the new interim information is propagated in a forward and backward direction to other PCG nodes as determined by the structure (edges) of the PCG 545. Each node is visited until the traversal 580 is complete, i.e., when all PCG nodes have been visited 550. Note that the new interim information is propagated in a forward and backward direction in one pass of the traversal. If the interprocedural solution is unchanged 560, the method terminates 570. Otherwise, the body of the loop is repeated 562.

FIG. 6 is now further described. The source program is input to an optimizing compiler 105. The phases of optimization 625–628 include analyses and transformations of the program. A particular instance of our method, such as analysis of pointer aliases, corresponds to one of these optimization phases (in the diagram, it is identified as optimization phase i 627). The information generated during phase i can be used by subsequent optimization phases. The flow chart of FIG. 5, described above, demonstrates the order of steps for phase i.

The following is a pseudo-code description of our general method 500 for determining interprocedural bidirectional information. It is assumed that an intraprocedural data flow framework is defined for the problem. As described in the background section, each node Y of this framework is associated with a "transfer function, and $IN_Y$ and $OUT_Y$ are related as described there. In addition, $OUT_{entry}$ and $OUT_Y$, for each call site node Y, are determined as indicated below.

$S_1$:. foreach procedure,
    $OUT_{entry} = TOP$
    $OUT_{exit} = TOP$
$S_2$: repeat;
$S_3$:     foreach procedure P visited in a topological traversal over the PCG;
$S_4$:       compute $OUT_{entry}$ of P using $IN_y$ at each call site Y which invokes P;
$S_5$:       perform intraprocedural analysis of P, computing $OUT_{exit}$ of P;
    if Y is a call site in P
    compute $OUT_y$ using
    $OUT_{exit}$ of the called procedure;
    else
    compute $OUT_y$ using $IN_y$ and its transfer function;
$S_6$: until convergence;

The pseudo-code description is used to provide a more detailed account of the general method 500 for interprocedural bidirectional data flow analysis. It is assumed that the PCG 510 and the internal representations of the program's routines 520 have already been constructed. In step $S_1$, the entry and exit nodes of each procedure are initialized to TOP 525. Steps $S_2$ through $S_6$ comprise a loop which is repeated until the interprocedural solution (i.e., $OUT_{entry}$ and $OUT_{exit}$ at each procedure) is unchanged by an iteration of the loop 560. In the FIG. 5 flow chart, the backwards-directed arrow for this loop is 562. When the loop converges, the interim interprocedural solution becomes the final solution 570. Steps $S_3$ through $S_5$ comprise a loop 580 in which each node in the PCG is visited, in topological order. Steps $S_4$ and $S_5$ comprise a PCG node visit (here Box 530 of FIG. 5 is performed during the topologically ordered visits, which is an optimization). At step $S_4$, the OUT interim solution at the entry node of P is determined. First the meet over all the OUT interim solutions holding at the call sites which invoke procedure P is performed. Then the meet of this result with the current interim solution for OUT at the entry node is performed, to arrive at a new interim solution. In FIG. 5, this is the interprocedural forward propagation of Box 545. At step $S_5$, the intraprocedural analysis of P is performed 530. As a result of the analysis, a new interim solution at $OUT_{exit}$ of P is determined. For call site nodes, as with other nodes, new IN interim solutions are determined from the OUT interim solutions at predecessor nodes and new OUT interim solutions are determined by applying the transfer function associated with the node to its interim IN solution. However, here the transfer function depends not on local information but on information which holds outside the procedure. Since the interprocedural problem is bidirectional, it depends on information holding in the called procedure. The transfer function For the call site is applied by assigning the interim solution holding at the exit node of the called procedure to the OUT interim solution at the call site node. Since the procedures are visited in topological order, the called procedure has not yet been visited during this iteration through the PCG, so the interim solution determined for its exit node during the previous iteration is used. This is how information is propagated backward in the call graph. This step is the interprocedural backward propagation of Box 545 in FIG. 5. Note that this occurs during a topological (forward) traversal: a backward (reverse topological) traversal of the call graph is unnecessary.

For efficiency, the iterative algorithm could be implemented with a worklist representing the nodes yet to be processed.

An example of an application of our framework is the determination of interprocedural aliases in programming languages that include pointers, e.g., C, $C^{++}$, and Fortran 90.

Interprocedural Alias Analysis

Out method for determining interprocedural aliases is now described. This is an example of our general purpose method 500 for determining interprocedural bidirectional data flow information. Aliases occur when two or more access paths refer to the same storage location. An access path is an 1-value expression which is constructed from variables, pointer indirection operators, and field select operators. Static aliases occur due to the FORTRAN EQUIVALENCE or C union construct and are constant for the duration of the program execution. Static alias information is typically determined during the semantic phase of compilation, and is not further considered here. Dynamic aliases arise during program execution. Program constructs such as the FORTRAN reference parameter mechanism and pointers induce dynamic aliasing. Two access paths are may-aliases at a point p in a program if they refer to the same storage location in some execution instances of p. This section describes the determination of may-aliases. May-aliases are referred to as aliases, whenever the meaning is clear from context. In tile presence of pointers, the alias relations at the exit of a called routine are propagated to the return site in the calling routine and those at the call site in the calling routine are propagated to the entry node of the called routine. Thus, interprocedural alias analysis in the presence of pointers is bidirectional.

Figure 7:
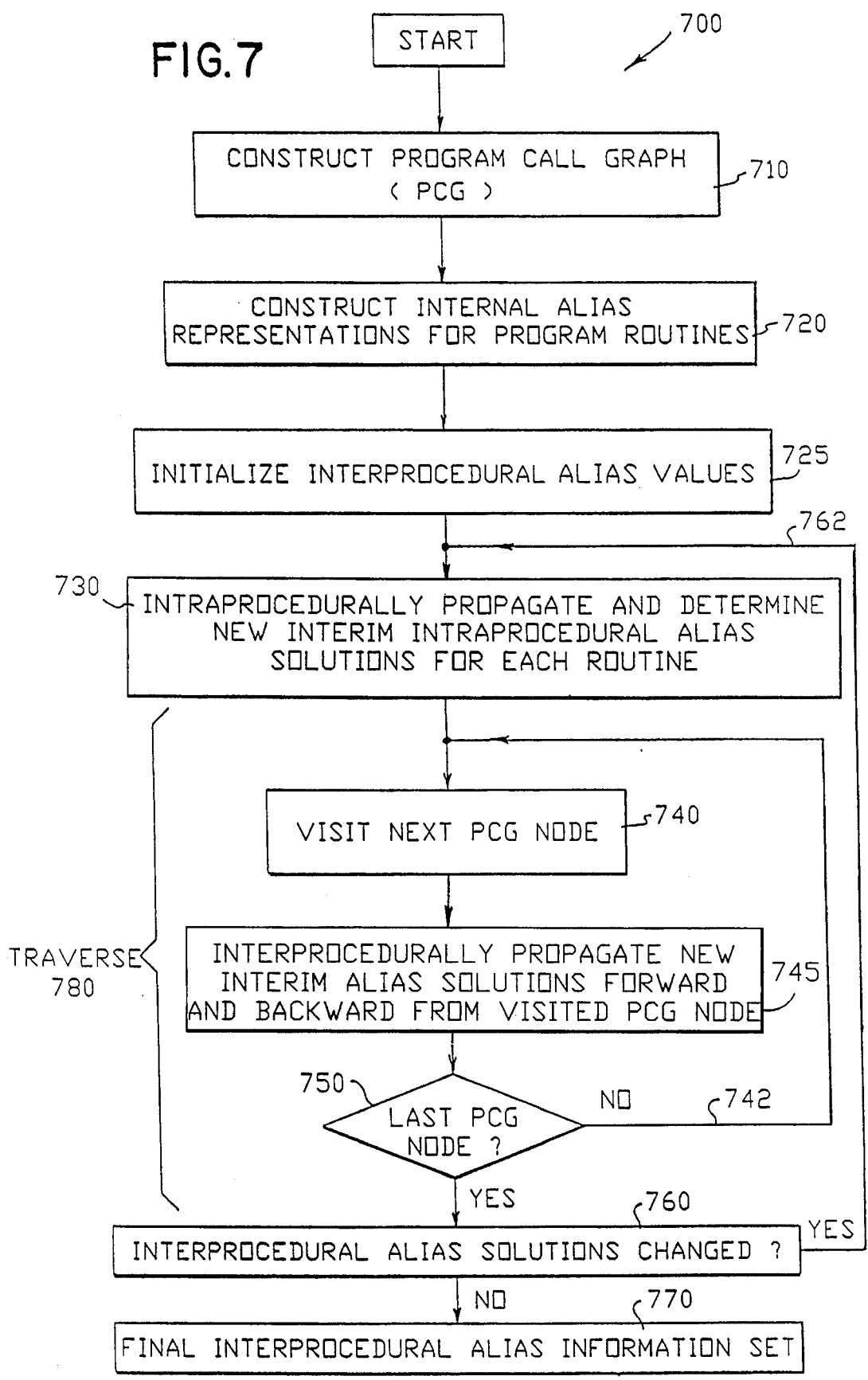
FIG. 7 is a flow graph showing the steps of the present invention for computing interprocedural alias information.

FIG. 7 is a flow chart which illustrates the steps of the present invention for computing interprocedural alias information. The application of the general method 500 to this problem results in a method 700 which determines interprocedural alias information by traversing the Program Call Graph (PCG).

The method 700 in FIG. 7 starts by building or constructing 710 a PCG 610 using techniques disclosed in the prior art. Typically, the construction of the PCG 710 is performed by an "interprocedural collector" (107 in FIG. 6) that is located in the computer system 100 compiler 105 (preferably in the optimizer 106) which also collects alias information.

After the set of application program 102 routines has been identified, an internal(intraprocedural) representation of each routine is constructed 720 which contains the alias information. The method does not depend upon the particular form of the internal representation, and one preferred embodiment uses a summary representation in all cases for efficiency.

After initialization 725 of the interprocedural solution 660 to the static alias set for each routine, the sequence of steps of the method is repeated until the interprocedural alias solution converges, as described below.

As each procedure is visited, alias information within it is propagated from the entry node by some intraprocedural alias analysis method 730. Updated exit information is propagated backward in the PCG to the return points of invoking procedures, and updated call site information is propagated forward in the PCG to the entry point of the called procedure 745. Each node is visited until the traversal 780 is complete, i.e. when all PCG nodes have been visited 750. Note that the new interim alias information is propagated in a forward and backward direction in one pass of the traversal. If the interprocedural solution is unchanged 760, the method terminates 770. Otherwise the body of the loop is repeated 762.

The following pseudo-code describes the method for determining interprocedural alias information in the presence of pointers. Let $A^Y_{IN}$ and $A^Y_{OUT}$ be the set of alias relations holding at the entry and exit of node Y, respectively. $A^Y_{IN}$ and $A^Y_{OUT}$ correspond to $IN_Y$ and $OUT_Y$ as defined before. $A_{IN}$ and $A_{OUT}$ are used when the node Y in question is clear from context.

$S_1$: foreach procedure, $A^{entry}_{OUT}$=STATIC_ALIASES $A^{exit}_{OUT}$={ }

$S_2$: repeat;
$S_3$: foreach procedure P visited in a topological traversal over the PCG;
$S_4$: compute $A^{entry}_{OUT}$ of P using $A^Y_{IN}$ at each call site node Y which invokes P;
$S_5$: perform intraprocedural analysis of P,
  computing $A^{exit}_{OUT}$ of P;
  if Y is a call site in P compute $A^Y_{OUT}$ using
    $A^{exit}_{OUT}$ of the called procedure; else
  compute $A^Y_{OUT}$ using $A^Y_{IN}$ and its transfer function;
$S_6$: until convergence;

Using the pseudo-code description, a more detailed account of the method 700 for interprocedural bidirectional alias analysis is now provided. The steps $S_1$ through $S_6$ correspond to the same steps in the general method 500 described above. In step $S_1$, the static aliasing for a procedure is used to initialize its $A^{entry}_{OUT}$ set 725. Steps $S_2$ through $S_6$ comprise a loop 762 which is repeated until the interprocedural alias solution (i.e., $A^{entry}_{OUT}$ and $A^{exit}_{OUT}$ at each procedure) is unchanged by an iteration of the loop 760. When the loop converges, the interim interprocedural solution becomes the final solution 770. Steps $S_3$ through $S_5$ comprise a loop 780 in which each node in the PCG is visited, in topological order. Steps $S_4$ and $S_5$ comprise a PCG node visit. At step &, alias information at the entry node of P, $A^{entry}_{OUT}$, is determined by first unioning the intraprocedural aliases (i.e., interim solutions) holding at the call sites which invoke procedure P and then unioning the resulting set with the current interim solution at the entry node of P, to arrive at a new interim solution 745. At step $S_5$, the intraprocedural analysis of P is performed 730. As a result of the analysis, a new interim solution at $OUT_{exit}$ of P is determined. Due to pointers, the interprocedural alias problem is bidirectional. For a call site node Y, as with the general method, $A^{exit}_{OUT}$ of the called procedure (the interim solution which was determined during the previous iteration through the PCG) becomes the new interim solution at $A^{exit}_{OUT}$. This is how information is propagated backward in the call graph 745. (We introduce an enhancement to the precision of this backward walk, described in the ensuing section.) As with our general method, topological-order iterations over the PCG are sufficient.

For efficiency, the iterative algorithm could be implemented with a worklist representing the nodes yet to be processed.

Figures 8, 9:
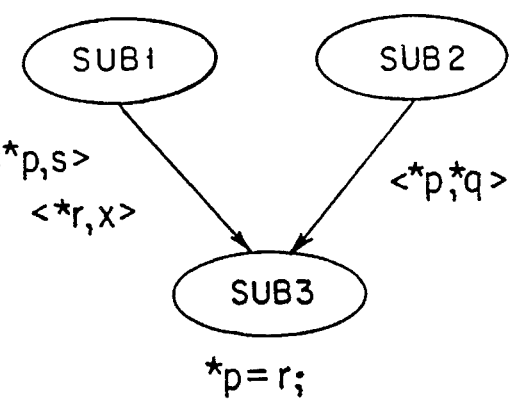
FIG. 8 is a program example which is used to illustrate the algorithm for determining interprocedural alias information in the presence of pointers.
FIG. 9 is a program example which is used to illustrate the matching of call and return interprocedural alias information.

FIG. 8 is an example program with pointer-induced aliases. Statement S0 contains a declaration of global variables. Procedure P is defined in statements S1 through S7. Procedure Q is defined in statements S8 through S11. In the following, we denote that variables a and b are aliased by <a,b>. The topological traversal of the call graph involves visiting P and then Q. $A^{entry}_{OUT}$ is initially the empty set for P. Intraprocedural analysis detects that the alias <*u,a> is generated by statement $S_4$ and holds at the call site $S_5$. $A^{exit}_{OUT}$ for Q is initially the empty set, so the interim solution for OUT at the call site $S_5$ is assigned the empty set. At $S_7$, the exit node of P, intraprocedural analysis determines that the interim solution is also the empty. Next Q is visited. The interim solution at its entry node is determined from the interim solution for IN at the call site $S_5$, and so is assigned {<*u,a>}. Intraprocedural analysis determines that at $S_{10}$, the alias <*u,b> is generated and the alias <*u,a> no longer holds. Intraprocedural analysis also determines that at $S_{11}$, the exit node of Q, the interim solution is {<*u,b>}. This completes the first traversal of the call graph. Interprocedurally relevant interim solutions have changed, so a second traversal is required. In the second visit to P, the interim solution at OUT for the call site node $S_5$ becomes {<*u,b>}, because this is the interim solution at the exit node for Q. Intraprocedural analysis determines that at $S_7$, the exit node of P, the interim solution is now {<*u,b>}. In the second visit to Q, no interim solutions are modified. Since the interim solution at the exit node of P is altered by the second traversal, a third traversal takes place. No changes occur during the third traversal, so the algorithm terminates and the current interim solutions comprise the final solution.

FIG. 9 shows three procedures, SUB1, SUB2, and SUB3, and the corresponding PCG. This figure is used to illustrate a preferred embodiment of our method for determining interprocedural alias information. Alias relations holding at the entry node of SUB3 consist of {<p,s>, <*r,X >, <*p, *q>}. (It is assumed that no alias relations hold before any of the procedures are called.) Of these three alias relations, <*p,s> and <*r,X> are propagated along the PCG edge from SUB1 to SUB3, and <*p,*q> is propagated along the PCG edge from SUB2 to SUB3. The alias relations holding at the exit of SUB3 are different from those at the entry node, due to the assignment to *p in SUB3, and are propagated to the points in SUB1 and SUB2 immediately following the invocations of SUB3. Our interprocedural bidirectional analysis correctly determines <*p,s>, <*r,X>, <**p,*r 22 , <**p,X>, <*s *r>, <*s,X> as the alias relations holding immediately after the call to SUB3 in SUB1, and <*p,*q>, <**p,*r>, <**q,*r> as the alias relations holding immediately after the call to SUB3 in SUB2.

Although a called procedure can affect the aliases holding on return from the call sites which invoke it, $A^{exit}_{OUT}$ of a procedure does not uniformly affect all the procedures which call it. Rather, the aliases holding on return from a call site $C_a$ are affected only by a subset of $A^{Exit}_{OUT}$ of the called procedure. This subset includes only those aliases induced by aliases holding just prior to $C_a$ or generated in the called procedure independently of the aliases holding at the invoking call sites.

Our method correctly identifies, for each alias relation of $A^{exit}_{OUT}$, the call sites whose aliases have induced the alias relation. The transfer functions and the representation of the alias relation are extended to accomplish this.

Given this disclosure, a person skilled in the computer arts could develop alternative equivalent embodiments which are within the contemplation and scope of the present invention.

We claim:

1. In a computer processor executing a computer compiler, a computer implemented method performed by the computer compiler for determining the Maximum Fixed Point interprocedural solution of an interprocedural bidirectional data flow problem for a computer program application comprising the steps of:

a. constructing a Program Call Graph of the computer program application, the Program Call Graph having a plurality of Program Call Graph nodes and edges, each Program Call Graph node representing a routine in the computer program application and each Program Call Graph edge connecting two Program Call Graph nodes, a calling Program Call Graph node and a called Program Call Graph node, the Program Call Graph edge having a direction from the calling Program Call Graph node to the called Program Call Graph node;

b. constructing an intraprocedural representation for each Program Call Graph node, the intraprocedural representation being a flow graph with one or more Intraprocedural Flow Graph nodes, each Intraprocedural Flow Graph node representing a program statement that is able to change a data flow solution, each Intraprocedural Flow Graph having one entry node, one exit node, a call site node for each of zero or more call sites in the routine, and a return point associated with each call site;

c. in the flow graph in each Program Call Graph node, initializing an entry node value for the entry node and an exit node value for the exit node, the entry node value and the exit node value being interprocedural values that represent an interim fixed point interprocedural solution for the routine represented by the Program Call Graph node;

d. for each Program Call Graph node in the Program Call Graph, determining an interim intraprocedural solution by means of a data flow analysis method, the interim intraprocedural solution including a new exit node value at the exit node and a new call site value at each of the call sites, and substituting the new exit node value for the exit node value and the new call site values for the respective call site values;

e. determining a new interim fixed point interprocedural solution for each of the Program Call Graph nodes in topological order in the Program Call Graph by interprocedurally propagating the new exit node value from the exit node to the call site return point of each of the calling Program Call Graph nodes calling the Program Call Graph node interprocedurally propagating the new call site values from the Program Call Graph node call sites to each of the entry nodes of the called program Call Graph nodes called by the Program Call Graph node; and f. if any interprocedural values have been modified by the iteration performed by step e, then going to step d; otherwise selecting the current interprocedural values as the Maximum Fixed Point interprocedural solution.

2. A method for determining the Maximum Fixed Point solution of an interprocedural bidirectional data flow problem for a computer program as in claim 1 above where the intraprocedural representation is in summary form.

3. A method for determining the Maximum Fixed Point solution of an interprocedural bidirectional data flow problem for a computer program as in claim 1 above where the intraprocedural representation is flow-sensitive because intraprocedural control flow information is included in determining the interim intraprocedural solution.

4. A method for determining the Maximum Fixed Point solution of an interprocedural bidirectional data flow problem for a computer program as in claim i above where the intraprocedural representation is flow-insensitive because intraprocedural control flow information is not included in determining the interim intraprocedural solution.

5. A method for determining the Maximum Fixed Point solution of an interprocedural bidirectional data flow problem for a computer program as in claim 1 above where the intraprocedural representation is a Sparse Evaluation Graph, the Sparse Evaluation Graph being a Sparse representation of forward or backward propagation of data flow values.

6. A method for determining the Maximum Fixed Point solution of an interprocedural bidirectional data flow problem for a computer program as in claim 1 where each entry node value or each interim fixed point interprocedural solution is identified with an Inducing Program Call Graph node, the Inducing Program Call Graph node having the call site inducing the new entry node values, and the interprocedural propagation propagating zero or more of the new exit node values only to the respective call site return point of the Inducing Program Call Graph node.

7. In a computer processor executing a computer compiler, a computer implemented method performed by the computer compiler for determining the Maximum Fixed Point interprocedural solution of one or more aliases induced by pointers, for programming languages that include general pointers, for a computer application program comprising the steps of:

a. constructing a Program Call Graph of the computer application program, the Program Call Graph having a plurality of Program Call Graph nodes and edges, each Program Call Graph node representing a routine in the computer application program and each Program Call Graph edge connecting two Program Call Graph nodes, a calling Program Call Graph node and a called Program Call Graph node, the Program Call Graph edge having a direction from the calling Program Call Graph node to the called Program Call Graph node;

b. constructing an intraprocedural representation for each Program Call Graph node, the intraprocedural representation being a flow graph with one or more Intraprocedural Flow Graph nodes, each Intraprocedural Flow Graph node representing a program statement that is able to change an alias solution, each Intraprocedural Flow Graph having one entry node, one exit node, a call site node for each of zero or more call sites in the routine, and a return point associated with each call site;

c. in the flow graph in each Program Call Graph node, initializing an entry node alias value for the entry node and an exit node alias value for the exit node, the entry node alias value and the exit node alias value being interprocedural values that represent an interim fixed point interprocedural alias solution for the routine represented by the Program Call Graph node;

d. for each Program Call Graph node in the Program Call Graph, determining an intraprocedural interim alias solution by means of an alias analysis method, the interim intraprocedural alias solution including a new exit node alias value at the exit node and a new call site alias value at each of the call sites, and substituting the new exit node alias value for the exit node alias value and the new call site alias values for the respective call site alias values;

e. determining a new interim fixed point interprocedural solution for each of the Program Call Graph nodes in topological order in the Program Call Graph by interprocedurally propagating the new exit node alias value from the exit node to the call site return point of each of the calling Program Graph nodes calling the Program Call Graph node and interprocedurally propagating the new call site alias values from the Program Call Graph node call sites to each of the entry nodes of the called Program Call Graph nodes called by the Program Call Graph node; and f. if any interprocedural values have been modified by the iteration performed by step e, then going to step d; otherwise selecting the current interprocedural values as the Maximum Fixed Point interprocedural solution.

8. A method for determining the Maximum Fixed Point solution of an interprocedural aliasing problem for a computer program as in claim 7 where each entry node alias value of each interim fixed point interprocedural alias solution is identified with an Inducing Program Call Graph node, the Inducing Program Call Graph node having the call site inducing the new entry node alias values, and the interprocedural propagation propagating zero or more of the new exit node alias values only to the respective call site return point or the Inducing Program Call Graph node.

9. A computer system having a platform with random access memory, a central processing unit, an input/output interface and an operating system, also having one or more input/output means, one or more application programs, and a computer processor executing a computer compiler, a computer implemented method for determining the Maximum Fixed Point solution of an interprocedural bidirectional data flow problem for a computer application program by performing the steps of:

a. constructing a Program Call Graph of the computer program application, the Program Call Graph having a plurality of Program Call Graph nodes and edges, each Program Call Graph node representing a routine in the computer program application and each Program Call Graph edge connecting two Program Call Graph nodes, a calling Program Call Graph node and a called Program Call Graph node, the Program Call Graph edge having a direction from the calling Program Call Graph node to the called Program Call Graph node;

b. constructing an intraprocedural representation for each Program Call Graph node, the intraprocedural representation being a flow graph with one or more Intraprocedural Flow Graph nodes, each Intraprocedural Flow Graph node representing a program statement that is able to change a data flow solution, each Intraprocedural Flow Graph having one entry node, one exit node, a call site node for each of zero or more call sites in the routine, and a return point associated with each call site;

c. in the flow graph in each Program Call Graph node, initializing an entry node value for the entry node and an exit node value for the exit node, the entry node value and the exit node value being interprocedural values that represent an interim fixed point interprocedural solution for the routine represented by the Program Call Graph node;

d. for each Program Call Graph node in tile Program Call Graph, determining an interim intraprocedural solution by means of a data flow analysis method, the interim intraprocedural solution including a new exit node value at the exit node and a new call site value at each of the call sites, and substituting the new exit node value for the exit node value and the new call site values for the respective call site values;

e. determining a new interim fixed point interprocedural solution for each of the Program Call Graph nodes in topological order in the Program Call Graph, by interprocedurally propagating the new exit node value from the exit node to the call site return point of each of the calling Program Call Graph nodes calling the Program Call Graph node and interprocedurally propagating the new call site values from the Program Call Graph node call sites to each of the entry nodes of the called Program Call Graph nodes called by the Program Call Graph node; and f. if any interprocedural values have been modified by the iteration performed by step e, then going to step d; otherwise selecting the current interprocedural values as the Maximum Fixed Point interprocedural solution.

* * * * *